United States Patent [19]

Rittler

[11] Patent Number: 4,786,620

[45] Date of Patent: Nov. 22, 1988

[54] PHYLLOSILICATE TREATMENT

[75] Inventor: Hermann L. Rittler, Corning, N.Y.

[73] Assignee: Corning Glass Works, Corning, N.Y.

[21] Appl. No.: 862,256

[22] Filed: May 12, 1986

[51] Int. Cl.$^4$ .................. C04B 33/13; C04B 33/00
[52] U.S. Cl. ..................... 501/147; 501/141;
       501/150; 501/153; 501/154; 106/DIG. 3
[58] Field of Search ............... 501/127, 141, 147, 154,
                    501/150, 4, 7, 10, 153; 106/DIG. 3

[56] References Cited

U.S. PATENT DOCUMENTS

| 2,987,405 | 6/1961 | Baumann | 501/147 |
|---|---|---|---|
| 3,279,930 | 10/1966 | Van Der Beck | 501/141 |
| 3,325,340 | 6/1967 | Walker | 106/DIG. 3 |
| 3,464,880 | 9/1969 | Rinehart | 501/7 |
| 3,573,076 | 3/1971 | Rittler | 501/4 |
| 3,585,053 | 6/1971 | Rittler | 501/4 |
| 3,585,054 | 6/1971 | Karstetter | 501/10 |
| 3,997,352 | 12/1976 | Beall | 501/7 |
| 4,074,992 | 2/1978 | Voss | 501/7 |
| 4,074,993 | 2/1978 | Ackerman | 501/7 |
| 4,339,540 | 7/1982 | Beall et al. | 106/DIG. 3 |

Primary Examiner—William R. Dixon, Jr.
Assistant Examiner—Anthony Green
Attorney, Agent, or Firm—Clinton S. Janes, Jr.

[57] ABSTRACT

There is disclosed a natural phyllosilicate and, in solid solution therewith, at least one additional silicate or spinel phase such as beta-quartz, beta-spodumene, biotite, donathite, magnetite and $Ca_2MgFe_2O_6$. There is also disclosed a method of producing such solid solution by introducing a phyllosilicate into a salt bath to effect an ion exchange between the salt of the bath and the phyllosilicate and subjecting the ion-exchanged phyllosilicate to a thermal treatment to develop a new phase which forms a solid solution.

8 Claims, No Drawings

PHYLLOSILICATE TREATMENT

RELATED APPLICATION

My application, Ser. No. 861,939, now U.S. Pat. No. 4,715,987, filed of even date herewith and entitled "Method of Treating Phyllosilicates", discloses and claims a method of forming a product from a naturally-occurring phyllosilicate which comprises exposing the phyllosilicate to a source of exchangeable cations to effect a change in the chemical makeup of the phyllosilicate interlayer by ion transfer, reacting the ion-exchanged phyllosilicate with a primary aminocarboxy acid to expand the cell structure and cause gel formation, introducing the gel into an ion exchange bath to flocculate the gel and thereby form a gel-floc interface, and withdrawing flocculated gel from the gel-floc interface. The exposure of the phyllosilicate may be to an aqueous solution of an inorganic salt, or may be to a molten bath of one or more inorganic salts. There is no mention of phase change.

BACKGROUND OF THE INVENTION

This invention relates to sheet silicates, also known as lattice layered silicates or phyllosilicates. It is particularly concerned with solid solutions produced from phyllosilicates, and with an ion exchange procedure for their production.

Essentially any phyllosilicate, whether of natural or synthetic origin, may serve as a starting material. However, the natural materials are generally of greater interest from an economic standpoint. The silicate minerals of interest include vermiculite, beidellite, nontronite, volchonskoite, saponite, stevensite, sauconite, pimelite, bentonite, montmorillonite, hectorite, the smectites, attapulgite, sepiolite, phlogopite and biopyrobole.

Sheet silicates of the mica type are built of two units, viz., a tetrahedral sheet and an octahedral sheet. The former consists of tetrahedra of Si—O linked together to form a hexagonal network such that the bases thereof are coplanar and the apices thereof point in the same direction. This configuration yields a Si:O ratio of 2:5. In contrast, the octahedral sheet is generated through the impingement of two tetrahedral sheets pointing toward each other and crosslinked by the sharing of oxygens by Mg (or Al, Fe) in octahedral coordination. The two octahedral corners not falling in the plane of apical oxygens are occupied by hydroxyl or fluoride ions. It is possible that a composite sheet formed in this manner will be electrically neutral, in which case Van der Waals-type forces bond it to the sheets immediately above and below. More commonly, however, an excess negative charge exists due either to ion substitutions or unoccupied sites (vacancies) or a combination of both. Differences in properties arise both from the degree of charge deficiency as well as the location of the excess charge. Charge balance is restored through the uptake of foreign cations in interlayer positions in 12-fold coordination due to hexagonal rings of oxygens located in the sheets above or below.

In order to create a product from vermiculite, it is usually necessary to delaminate the particles. This involves separating the crystals at the interlayer to form high aspect ratio platelets. These may be suspended as a gel and subsequently deposited in any desired form, such as a sheet, or otherwise processed.

At one time it was standard practice to heat vermiculite particles to an elevated temperature. This caused the water-containing interlayer to expand and pop open. Later, it was learned that vermiculite could be expanded by reflux treatment with various salts in aqueous solution. Thereafter, application of an intense shearing force to the expanded particles caused them to separate at the interlayer and form a gel.

The silicate layer units in these minerals have a thickness of about 10 Angstrom units, with the main elemental constituents being Mg, Al, Si, and $O_2$. These silicate layers are separated by an interlayer composed of water molecules associated with cations, such as $Mg^{++}$, $Na^+$, $K^+$ and $H^+$.

The three layer micas in general, and natural vermiculite in particular, have been extensively studied because of their potential for thermal resistance and electrical insulation. The interest has been heightened considerably with the recent flight from asbestos products.

There are areas of utility where it would be desirable to modify the normal properties of the phyllosilicates. For example, a lower coefficient of expansion would be desirable in some instances. Likewise, iron impurities may be deleterious to electrical properties, and removal would be expedient. Further, greater resistance to rehydration would be a boon.

RELATED LITERATURE

U.S. Pat. No. 3,325,340 (Walker et al.) describes a process for producing an aqueous suspension of vermiculite flakes which comprises treating crystals of vermiculite with a selected alkyl ammonium, lithium, lysine, or ornithine cation in an aqueous solution, immersing the crystals in water to promote swelling normal to the main cleavage plane, and subjecting the swollen crystals to intense mechanical shearing to form a stable suspension. Examples prescribe heating or refluxing for several hours in the solution of cation salt followed by immersion for a matter of hours to swell.

U.S. Pat. No. 3,434,917 (Kraus et al.) discloses a similar method wherein vermiculite ore is successively exposed to sodium chloride and lithium chloride salt solutions, then immersed in water to swell, and finally subjected to intense mechanical shearing to form platelets. A specific example prescribes steeping the ore in salt solution for 24 hours.

United Kingdom Patent Specification Nos. 1,593,382 and 1,593,383 disclose methods in which vermiculite is exposed to a salt of sodium, lithium, or an organo-substituted ammonium cation, followed by aqueous treatment and intense shearing action. The suspension thus produced may be washed, filtered, and then shaped against a mold as water is removed.

My pending application, Ser. No. 848,791, now U.S. Pat. No. 4,676,929, filed Apr. 7, 1986 discloses gels composed of hydrated phyllosilicates dispersed in a primary aminocarboxy acid, or lysine orotate, or glycylglycine as an expanding agent. Both organic and inorganic additions, as well as ion exchange products, are disclosed. The gels, with or without the additions, may be polymerized and may be formed or shaped. Also disclosed are methods for generating the gels and for treating the gels generated.

U.S. Pat. No. 4,339,540 (Beall et al.) discloses production of gels from selected, synthetic, lithium and/or sodium water-swelling micas, flocculation of the gel and the production of papers, films, fibers, boards and coatings therefrom. The synthetic phyllosilicates may be solid solutions, but there is no disclosure of phase change.

PURPOSES OF THE INVENTION

A basic purpose is to provide a novel ceramic material.

Another purpose is to convert a phyllosilicate into a solid solution exhibiting at least one additional phase.

A further purpose is to provide an ion exchange procedure for effecting such conversion.

A still further purpose is to provide such conversion under anhydrous conditions.

Another purpose is to provide a modified form of a phyllosilicate having physical properties different from those of the original phyllosilicate.

A specific purpose is to modify a phyllosilicate to impart a lower coefficient of thermal expansion.

A further specific purpose is to produce a donathite phase so that the iron content can be removed.

STATEMENT OF THE INVENTION

The invention provides a ceramic material comprising a solid solution of a phyllosilicate and at least one additional phase. The additional phase may be a silicate phase such as beta-quartz, beta-spodumene, or biotite, or a spinel phase such as $Fe_3O_4$, $Ca_2MgFe_2O_6$, or donathite. It further contemplates a method of chemically altering a phyllosilicate wherein the phyllosilicate is introduced into a salt bath to effect an ion exchange between the bath and the phyllosilicate. Either simultaneously, or thereafter, the ion-exchanged phyllosilicate is subjected to a thermal treatment, preferably at a temperature in excess of 200° C., to produce at least one additional phase in the phyllosilicate. Preferably a molten salt is employed and the thermal treatment is simultaneous with the ion exchange.

Where the salt bath is composed of lithium salts, the conversion is to a beta-quartz or beta-spodumene phase. Where the exchangeable ion is potassium, the solid solution may be biotite. With magnesium and lithium ions, a donathite phase may be developed.

GENERAL DESCRIPTION

The invention may be practiced with any phyllosilicate, either those commonly found in nature or synthetic counterparts such as disclosed in the Beall et al. patent mentioned above. Attention is centered primarily on the former because of economic considerations.

As described in my copending application filed of even date herewith, ion transfer into the interlayer from a source of exchangeable cations may occur from an aqueous solution or a molten salt bath. The rate of transfer is much faster in the molten bath because of the thermal stimulation. Thus, the present method contemplates ion transfer in the range of 100° C. to 900° C., but preferably employs a molten bath at a temperature above 200° C.

The particular salt bath selected will depend on the ion which it is desired to introduce. Thus, a eutetic mixture of potassium chloride and sulfate melts at about 690° C., while corresponding mixture of sodium salts melts at 625° C. Other baths contemplated may contain magnesium and lithium salts and may be used individually or in combination. Lithium salts tend to melt at lower temperatures.

The use of molten salt baths for other purposes, such as glass strengthening, metal working, and the like are described in detail in the prior literature. For present purposes, these practices and materials may be employed. The particular composition or salt selected will, of course, depend on the transfer ion desired for a given purpose.

The phase transformation from a phyllosilicate to a solid solution may be shown by x-ray diffraction patterns recorded on a phyllosilicate material before and after an ion transfer treatment. In addition, depending on the materials involved, certain other characteristic property changes occur also.

Thus, treatment of a phyllosilicate in a lithium salt bath tends to result in transfer of lithium ions into the phyllosilicate with resultant formation of a solid solution with beta-quartz or beta-spodumene. The resultant solid solution generally has a lower coefficient of thermal expansion than does the parent phyllosilicate.

Certain phyllosilicates tend to have a substantial iron content which can be detrimental. Treatment in a mixed bath of magnesium and lithium salts tends to form a donathite phase in which the iron segregates and can be removed magnetically.

A solid solution of biotite and phlogopite may be formed in a potassium salt bath. Due to the enhanced potassium content the solid solution will be more resistant to hydration. Various specific spinel transformations can provide unique crystal structures of interest for electronic purposes.

SPECIFIC EXAMPLES

Characteristic features of the present invention are the phase changes effected and the ion exchange treatments employed. The basic requirements are a source of exchangeable ion, a phyllosilicate into which the ion exchanges, and a source of thermal energy to effect development of the desired second phase.

A wide variety of phyllosilicate-salt bath combinations may be employed in practicing the invention. However, it is here illustrated with reference to a series of treatments administered to test samples of a vermiculite obtained from South Africa.

The test samples were taken from a common source to provide approximately uniform composition. An equal amount (100 grams) was employed in each test. The essential variable was the salt bath employed.

TABLE I sets forth the compositions of each different molten bath in weight percent, the bath temperature in °C., and the time of exposure in hours.

TABLE I

| Example | Salt | Temp (°C.) | Time (Hrs.) |
|---------|------|------------|-------------|
| A | Blank | — | — |
| B | $MgCl_2$ | 775 | 1 |
| C | $LiCl-Li_2SO_4$ | 600 | 1 |
| D | $LiCl-Li_2SO_4$ | 600 | 1 |
| E | $KCl-K_2SO_4$ | 800 | ½ |

Sample A was a blank, that is a sample that received no treatment, and that was retained for comparison purposes. Samples C and D received the same salt bath exposure, but were treated differently in subsequent drying. Thus, Sample C was dried for one hour at 60° C. on a hot plate, while Sample D was fired at 800° C. for one hour. The remaining samples were dried on a hot plate.

Following the salt bath treatment indicated in TABLE I, each sample was separated from the salt, throroughly rinsed in deionized water, centrifuged, and dried to remove surface water. A portion of each sample was then analyzed chemically by x-ray diffraction. A second portion was heated up to 1000° C. in three stages with weight change being measured at each stage. The total change is shown in percent in TABLE II as loss on ignition (LOI). Also, portions were analyzed by differential thermal analysis (DTA) to determine characteristic peaks in an intensity-temperature curve. The peaks characterize different crystal phases. The crystal phases observed, in addition to vermiculite, are shown in TABLE II. Finally, TABLE II shows the percentage of the sample that was −325 mesh after salt bath exposure, that is the weight percent that passed through a 325 mesh screen (less than app. 0.043 mm.)

TABLE II

| Example | A | B | C | D | E |
|---|---|---|---|---|---|
| $SiO_2$ | 39.8 | 8.7 | 46.0 | 46.0 | 41.5 |
| MgO | 25.3 | 46.8 | 26.2 | 26.2 | 27.9 |
| $Fe_2O_3$ | 5.4 | 35.1 | 5.8 | 5.8 | 6.3 |
| $Al_2O_3$ | 8.2 | 3.8 | 7.9 | 7.9 | 9.4 |
| $K_2O$ | 3.9 | — | 1.9 | 1.9 | 8.7 |
| CaO | 3.4 | — | 4.7 | 4.7 | 1.0 |
| $Na_2O$ | 0.0 | — | 0.1 | 0.1 | — |
| $Li_2O$ | 0.0 | — | 2.0 | 2.0 | — |
| LOI(%) | 13.4 | 5.2 | 4.3 | 4.3 | 4.1 |
| −325 mesh (%) | 2.0 | 91.4 | 63.6 | 63.6 | 48.9 |
| DTA peaks (°C.) | — | 1235 | 1050 1165 | 1085 1140 | 950 1150 |
| Phases in Solid Solution | — | Forsterite Donathite $Fe_3O_4$/ magnetite | Beta-spodumene | | Biotite |

EXAMPLE F

A sample of talc was added to the eutectic $KCl$-$K_2SO_4$ bath and maintained at 800° C. in that bath for 16 hours. The talc sample was removed, thoroughly rinsed, centrifuged and dried. The sample, as thus treated, was subjected to phase analysis, thereby revealing the presence of a substantial enstatite phase.

EXAMPLE G

Similarly, a sample of bentonite was added to the eutectic $KCl$-$K_2SO_4$ bath and maintained therein for 16 hours at 800° C. Following this combined ion exchange and thermal treatment, the bentonite sample was rinsed, centrifuged and dried as before. It was then examined for peaks in a x-ray analysis curve to determine phases present. It was observed that the main peaks occurred at 15 Å, 5.0 Å and 4.5 Å before treatment, whereas major peaks observed after treatment were at 4.1 Å and 3.2 Å. It is apparent a new phase has developed, but it could not readily be identified.

I claim:

1. A ceramic material consisting essentially of at least one solid solution, said one solid solution being composed of at least two crystal phases, one being a phyllosilicate crystal phase and a second being a crystal phase selected from the group consisting of a silicate and a spinel.

2. A ceramic material according to claim 1 wherein the second crystal phase is a silicate selected from the group consisting of a beta-quartz, beta-spodumene, forsterite, enstatite, and biotite.

3. A ceramic material according the claim 1 wherein the second crystal phase is a spinel selected from the group consisting of magnetite, donathite, and $Ca_2Mg$-$Fe_2O_6$.

4. A ceramic material according to claim 1 wherein the phyllosilicate crystal pahse is selected from the group consisting of vermiculite, beidellite, montronite, volchonskoite, saponite, stevensite, sauconite, pimelite, bentonite, montmorillonite, hectorite, the smectites, attapulgite, sepiolite, phlogopite, talc, biopyrobole, and synthetic counterparts thereof.

5. A method of chemically altering a phyllosilicate to produce a ceramic material consisting essentially of at least one solid solution, said one solid solution being composed of at least two crystal phases, one being a phyllosilicate crystal phase and a second being a crystal phase selected from the group consisting of a silicate and a spinel which comprises introducing the phyllosilicate into a source of cations exchangeable with the interlayer cations present in the phyllosilicate, said source of exchangeable cations being selected from the group consisting of an aqueous solution and a molten salt bath operating at a temperature of 100°-900° C., to effect an ion exchange between the source of exchangeable cations and the interlayer cations of the phyllosilicate, and either simultaneously or subsequently subjecting the ion-exchanged phyllosilicate to a thermal treatment at a temperature above 200° C. to produce said one solid solution.

6. A method according to claim 5 wherein the phyllosilicate is introduced into a molten salt bath operating at above 200° C. and up to 900° C. and is simultaneously ion-exchanged and thermally treated.

7. A method according to claim 5 wherein the phyllosilicate is introduced into an aqueous solution to effect the ion exchange and the ion-exchanged phyllosilicate is subsequently thermally treated at a temperature above 200° C. and up to 900° C.

8. A method according to claim 5 wherein said exchangeable cations are selected from the group consisting of $Li^+$, $K^+$, and $Mg^{+2}$.

* * * * *